US012091964B2

(12) United States Patent
Clegg et al.

(10) Patent No.: US 12,091,964 B2
(45) Date of Patent: Sep. 17, 2024

(54) BOREHOLE LOCALIZATION RELATIVE TO OBJECTS AND SUBTERRANREAN FORMATIONS

(71) Applicant: Halliburton Energy Services, Inc., Houston, TX (US)

(72) Inventors: Nigel Mark Clegg, Norwich (GB); Alban Duriez, Houston, TX (US); Vytautas Usaitis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 133 days.

(21) Appl. No.: 17/212,486

(22) Filed: Mar. 25, 2021

(65) Prior Publication Data

US 2021/0381365 A1   Dec. 9, 2021

Related U.S. Application Data

(60) Provisional application No. 63/082,600, filed on Sep. 24, 2020, provisional application No. 63/035,325, filed on Jun. 5, 2020.

(51) Int. Cl.
*E21B 47/09* (2012.01)
*E21B 47/08* (2012.01)
*G01V 3/34* (2006.01)

(52) U.S. Cl.
CPC .............. *E21B 47/09* (2013.01); *E21B 47/08* (2013.01); *G01V 3/34* (2013.01); *G01V 2210/66* (2013.01)

(58) Field of Classification Search
CPC ............. E21B 2200/22; E21B 47/0228; E21B 47/026; E21B 47/08; E21B 47/085;
(Continued)

(56) References Cited

U.S. PATENT DOCUMENTS

2004/0163443 A1 * 8/2004 McElhinney ......... E21B 47/022
73/152.01
2006/0095239 A1   5/2006 Frenkel
(Continued)

FOREIGN PATENT DOCUMENTS

WO   2020060883 A1   3/2020

*Primary Examiner* — Mohamed Charioui
*Assistant Examiner* — Christine Y Liao
(74) *Attorney, Agent, or Firm* — Benjamin Ford; Parker Justiss, P.C.

(57) ABSTRACT

This disclosure presents methods and processes to estimate a position parameter, an orientation parameter, a dip parameter, and a diameter parameter of an object or subterranean formation change proximate an active borehole. The object or formation can be an adjacent borehole. The parameters can be utilized by a geo-steering system or a well site job plan system to reduce an uncertainty surrounding or looking ahead of the active borehole to avoid a collision with the object or formation, to intercept the object or formation, or to place the active borehole in a more advantageous position. The parameters can be derived from collected component resistivity data that has been reconstructed utilizing a three-dimensional inversion algorithm. In some aspects, low resistivity data can be extracted to improve the estimating of the parameters. In some aspects, the process can be implemented in a downhole tool, in a surface system, or a combination thereof.

20 Claims, 10 Drawing Sheets

(58) Field of Classification Search
CPC ...... E21B 47/09; G01V 2210/66; G01V 3/26; G01V 3/34; G01V 3/38
See application file for complete search history.

(56) References Cited

U.S. PATENT DOCUMENTS

| | | |
|---|---|---|
| 2009/0177404 A1 | 7/2009 | Hartmann et al. |
| 2011/0231098 A1* | 9/2011 | Omeragic ................ G01V 3/28 702/7 |
| 2016/0069174 A1* | 3/2016 | Cannan ................ E21B 43/267 166/250.1 |
| 2016/0102500 A1* | 4/2016 | Donderici ........... E21B 41/0092 175/45 |
| 2016/0369626 A1* | 12/2016 | Donderici ................ G01V 3/38 |
| 2022/0333478 A1* | 10/2022 | Zeng ....................... E21B 47/13 |

\* cited by examiner

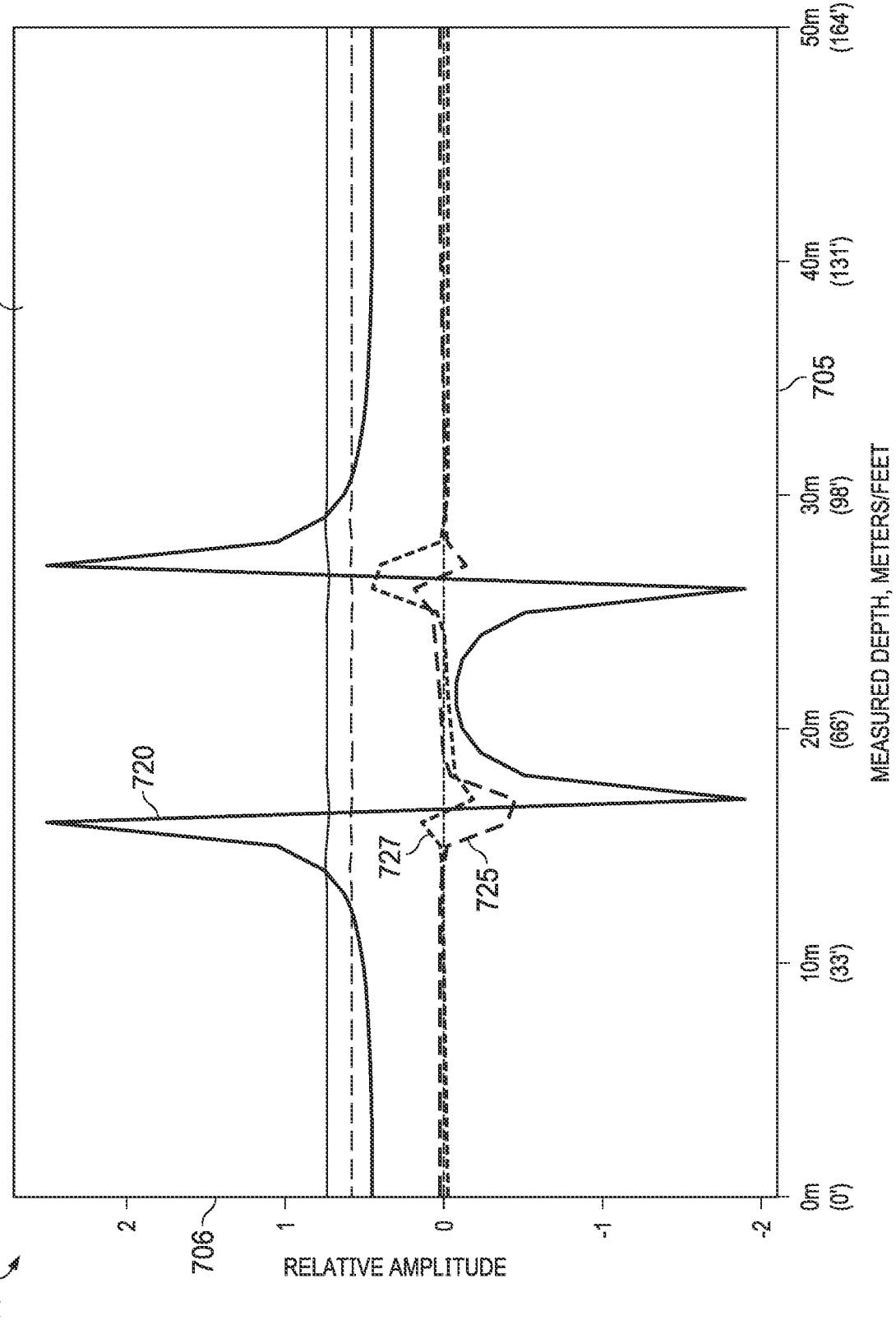

BOREHOLE LOCALIZATION RELATIVE TO OBJECTS AND SUBTERRANREAN FORMATIONS

CROSS-REFERENCE TO RELATED APPLICATION

This application claims benefit of U.S. Provisional Application Ser. No. 63/082,600, filed by Nigel Mark Clegg, et al. on Sep. 24, 2020, entitled "BOREHOLE LOCALIZATION RELATIVE TO OBJECTS AND SUBTERRANEAN FORMATIONS," and to U.S. Provisional Application Ser. No. 63/035,325, filed on Jun. 5, 2020, entitled "ADJACENT BOREHOLE LOCALIZATION" commonly assigned with this application and incorporated herein by reference in their entirety.

TECHNICAL FIELD

This application is directed, in general, to identifying the position of an object or subterranean formation change and, more specifically, to localizing the object or subterranean formation change relative to an active borehole.

BACKGROUND

When developing and drilling boreholes, it is important to be able to position the active borehole where desired proximate the surrounding geology of the subterranean formation and proximate adjacent boreholes. As drilling operations progress, the borehole position can change over time relative to adjacent boreholes, objects, or subterranean formations. In some aspects, the marked positions of adjacent boreholes may be inaccurate or missing. Being able to accurately position an active borehole proximate an adjacent borehole, object, or subterranean formation can reduce the uncertainty of relative positioning of the active borehole, which can improve well planning and active borehole positioning.

SUMMARY

In one aspect, a method is disclosed. In one embodiment, the method includes (1) collecting component resistivity data utilizing a resistivity tool located downhole of an active borehole of a well site, (2) reconstructing the component resistivity data to generate reconstructed resistivity data utilizing a three dimensional (3D) inversion algorithm, wherein the reconstructed resistivity data utilizes information on part of an object or a subterranean formation, and (3) computing generated results utilizing the reconstructed resistivity data.

In a second aspect, a borehole localization system is disclosed. In one embodiment, the borehole localization system includes (1) a resistivity tool, capable of receiving one or more input parameters and collecting component resistivity data, and located within an active borehole of a well system, and (2) a data localizer, capable of reconstructing resistivity data from the component resistivity data to generate reconstructed resistivity data, extracting low resistivity data from the reconstructed resistivity data, and detecting an object or a subterranean formation change, wherein the reconstructed resistivity data utilizes information on part of the object or the subterranean formation change.

In a third aspect, a computer program product having a series of operating instructions stored on a non-transitory computer-readable medium that directs a data processing apparatus when executed thereby to perform operations to determine generated results from component resistivity data is disclosed. In one embodiment, the operations include (1) instructing a resistivity tool to collect the component resistivity data, wherein the resistivity tool is located downhole of an active borehole of a well site, (2) reconstructing the component resistivity data to generate reconstructed resistivity data utilizing a 3D inversion algorithm, wherein the reconstructed resistivity data utilizes information on part of an object or a subterranean formation change, and the generated results utilizes the reconstructed resistivity data, and (3) directing a communication of the generated results to one or more of a user, a well site controller, or a geo-steering system.

BRIEF DESCRIPTION

Reference is now made to the following descriptions taken in conjunction with the accompanying drawings, in which:

FIG. 7 is an illustration of a diagram of an example graph showing deflection of two components of resistivity;

DETAILED DESCRIPTION

Figure 1A:
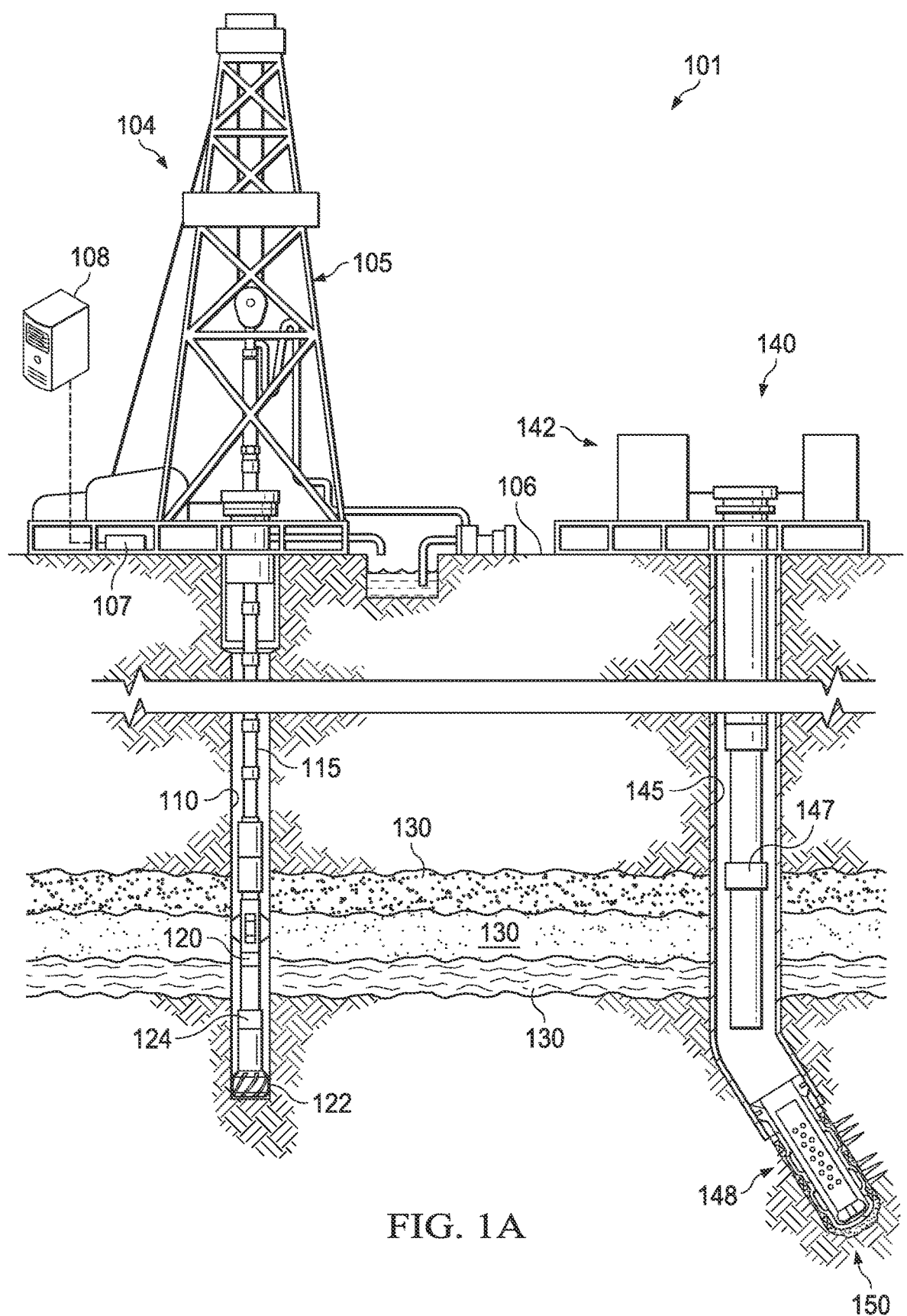
FIG. 1A is an illustration of a diagram of an example active well system using a collision avoidance goal.

In borehole development, users, such as well operators or engineers, use geo-steering techniques to maintain borehole development, e.g., drilling operations, along an intended path and direction. The borehole development can be for various uses, for example, hydrocarbon production, geothermal uses, scientific uses, mining uses, and other uses of boreholes. Knowing the position of the borehole relative to nearby, e.g., adjacent or proximate, boreholes, e.g., objects, or subterranean formation changes can be beneficial to ensure borehole separation or to ensure borehole interception at the desired location. Adjacent boreholes can be active or abandoned, and the borehole positioning data of the adjacent borehole can be accurate, inaccurate, or missing, such as a borehole drilled by another operator.

The conventional process of identifying and localizing adjacent objects or subterranean formation changes can result in a larger than desired uncertainty ellipses surrounding the active borehole. The uncertainty ellipses is the uncertainty of knowing the object placement or subterranean features around or ahead of an active borehole. Conventional processes can have uncertainty of the look ahead area, e.g., the area ahead of the drill bit. An active borehole can be a borehole being developed, drilled, fractured, or otherwise actively being utilized. Reducing the uncertainty ellipses around the active borehole would be beneficial by enabling more accurate borehole placement, and being able to drill or develop the borehole along a more desirable path.

This disclosure presents processes to combine resistivity tool data with a three-dimensional (3D) inversion algorithm to produce a subterranean model of a portion of the area surrounding the active borehole or a portion of the look ahead area, including determining or estimating output parameters, for example, a position parameter, an orientation parameter, a dip parameter, and a diameter parameter of a nearby object or subterranean formation change, e.g., a portion or part of the information for the object or subterranean formation change. For example, the object or subterranean formation change can be a metal pipe, an adjacent borehole, an oil-water barrier, or other objects or formations. Adjacent objects or subterranean formation changes can be in various orientations and positions relative to the active borehole, for example, to one side, above, or ahead of the of active borehole.

Various 3D inversion algorithms can be utilized. The resistivity tool data can be collected by one or more resistivity tools, for example, an ultra-deep resistivity tool, a shallow depth resistivity tool, or other types of resistivity tool. The resistivity tools can measure components of the resistivity field, for example, 3 components, 4 components, 9 components, or other number of components. As the number of measured components increases, the resulting accuracy of the disclosed method and processes can also increase. For example Matrix 1 shows an example matrix of resistivity measurements.

Example matrix of resistivity measurements       Matrix 1

$$\begin{bmatrix} \rho_{xx} & \rho_{xy} & \rho_{xz} \\ \rho_{yx} & \rho_{yy} & \rho_{yz} \\ \rho_{zx} & \rho_{zy} & \rho_{zz} \end{bmatrix}$$

where $\rho$ are rank-2 resistivity directional tensors.

The subterranean model can be used to localize adjacent boreholes such as to detect active or abandoned wells adjacent to the active borehole, reduce the risk of colliding with a nearby borehole while drilling the active borehole, increase the accuracy of intercepting a nearby borehole, optimize a producer borehole placement with respect to an injector borehole (where either the producer borehole or the injector borehole can be the active borehole and the other can be the adjacent borehole), calibrate and refine borehole subterranean position within a field, and have the ability to see the direction and dip angle of adjacent pre-existing wells, whether known from the field owner or unknown.

In some aspects, the subterranean model can be used to localize non borehole objects or subterranean formation changes, for example, an oil-water barrier. A subsurface geological feature that shows a change in resistivity major enough to impact on the electromagnetic resistivity field can potentially be identified in the component resistivity data and its position identified. Inversion can be used to represent identified features in a geological model or map. The greater the contrast in resistivity across the feature, the greater the impact that it will have on the component data.

Electromagnetic measurements from resistivity tools can be utilized to map the electrical properties of the formation around, or ahead of, the active borehole in which the resistivity tool is located. A 3D inversion algorithm can be applied to reconstruct the 3D structure of the resistivity contrasts contributing to the measured electromagnetic field. The homogeneous low resistivity data inherent to cased (such as having a casing) or completed boreholes or subterranean formation change barriers within the volume (a portion of the surrounding subterranean formation) measured by the resistivity tool can be extracted from the reconstructed volume to determine or estimate information or output parameters of the adjacent object or subterranean formation change, such as the position parameter, the orientation parameter, the dip parameter, and the diameter parameter.

The generated results can be used by a system or process, for example, a well site controller, a server, a data center, a well site job planner, or other types of computing systems, and can be used by a user, for example, an engineer or an operator. The generated results can be represented by data or by a visual representation. The generated results can be used to reduce the uncertainty of the localized, e.g., relative, position of the active borehole and an object or subterranean formation change.

The disclosed processes can be performed in real-time or near real-time as the resistivity data is collected. In some aspects, the processes can be performed downhole, for example, as part of the resistivity tools, as part of a downhole borehole localizer controller, or as part of other downhole tools. The resulting generated results, and optionally, the collected component resistivity data, can be communicated to other systems located downhole or located at a surface location, or communicated to distant computing system, such as a cloud environment or data center. The generated results can also be communicated to a user, such as using a printout, monitor, or display.

In some aspects, the processes can be performed by a surface or distant computing system. The collected resistivity tool data can be communicated uphole from the downhole resistivity tool, and be received by a surface computing system, for example, a well site controller or a surface borehole localizer controller. The surface computing system, or another computing system, such as a server, cloud environment, data center, mobile device, smartphone, tablet, or other types of computing systems, can perform the 3D inversion analysis and generate the resulting volume information.

Over the course of development of the field where the active borehole is located, the localization of the one or more objects or subterranean formation changes, e.g., generated results, can be utilized to refine the 3D model of the field. The generated results can be utilized by reservoir engineers to improve understanding of the distribution of the reservoir fluids and the dynamics of the reservoir fluids. In mature fields, which can have multiple existing boreholes, the generated results can reduce the risk of collision with these existing boreholes as new boreholes are drilled, and can improve well planning so that new boreholes can be placed closer to existing wells than is currently possible.

Turning now to the figures, FIG. 1A is an illustration of a diagram of an example active well system 101 using a collision avoidance goal. Active well system 101 can be a drilling system, a logging while drilling (LWD) system, a measuring while drilling (MWD) system, a seismic while drilling (SWD) system, a telemetry while drilling (TWD) system, other hydrocarbon, geothermal, mining, scientific well systems, and other types of borehole systems, such as a relief well, an injection well, or an intercept well. Active well system 101 includes borehole system 104 and borehole system 140. Borehole system 104 is a drilling system and includes a derrick 105 supporting a drill string 115, a well site controller 107, and optionally, a computing system 108. Derrick 105 is located at a surface 106. Extending below derrick 105 is a borehole 110 in which drill string 115 is inserted. Located at the bottom of drill string 115 are downhole tools 120 including a drill bit 122, and a resistivity tool 124. In some aspects, downhole tools 120 can be a bottom hole assembly (BHA). Other components of downhole tools 120 can be present, such as a local power supply (e.g., generators, batteries, or capacitors), telemetry systems, sensors, transceivers, geo-steering systems, borehole localizer controllers, and control systems.

Borehole system 140 is a completed well system and includes surface well equipment 142, a borehole 145, casing sections 147, an uncased section 148, and an end of borehole assembly 150. Borehole system 104 and borehole system 140 are located within and surrounded by a subterranean formation 130. Subterranean formation 130 can be one or more types of mineralogical and geological formations as naturally found in nature.

Well site controller 107 includes a processor and a memory and is configured to direct operation of active well system 101. Well site controller 107 can be communicatively coupled to computing system 108, for example, using a local area network, wireless network, wired network, internet, or other communication methods. Computing system 108 can be a mobile device, such as a smartphone, tablet, laptop, or other mobile computing system, or can be a server, cloud environment, data center, or other proximate or distant computing systems. Well site controller 107 or computing system 108 can be utilized to communicate with downhole tools 120, such as sending and receiving telemetry, data, instructions, and other information.

The processes described herein can be performed by one or more of the described systems, such as resistivity tool 124, other downhole tools, well site controller 107, or computing system 108. In some aspects, well site controller 107 or computing system 108 can communicate data and instructions to resistivity tool 124. In some aspects, well site controller 107 or computing system 108 can receive data transmitted from resistivity tool 124 or other downhole tools. In some aspects, computing system 108 can be located with downhole tools 120 and the reconstruction, extraction, and other processes can be completed at the downhole location. The results can be communicated to a drilling system or to a drilling operation system downhole, such as a geo-steering system, or communicated to a surface system. For example, a borehole localizer controller can be located as part of one or more various tools located at a downhole location or at a surface location.

Resistivity tool 124 can be directed to collect resistivity data from the surrounding subterranean formation 130. The collected resistivity data can be further processed by a downhole tool or be communicated to well site controller 107 or computing system 108 for further processing. The further processing can include reconstructing the resistivity data by applying a 3D inversion algorithm to the data. In some aspects, the further processing can include extracting the low resistivity data. The reconstructed resistivity data and other data, such as the low resistivity data, can be utilized by other processes or communicated to other systems, such as being used by a user or a well site job planner. In some aspects, the reconstructed resistivity data and the low resistivity data can be represented visually for use by a user, for example, to ensure that borehole system 104 avoids a collision with borehole system 140.

Figure 1B:
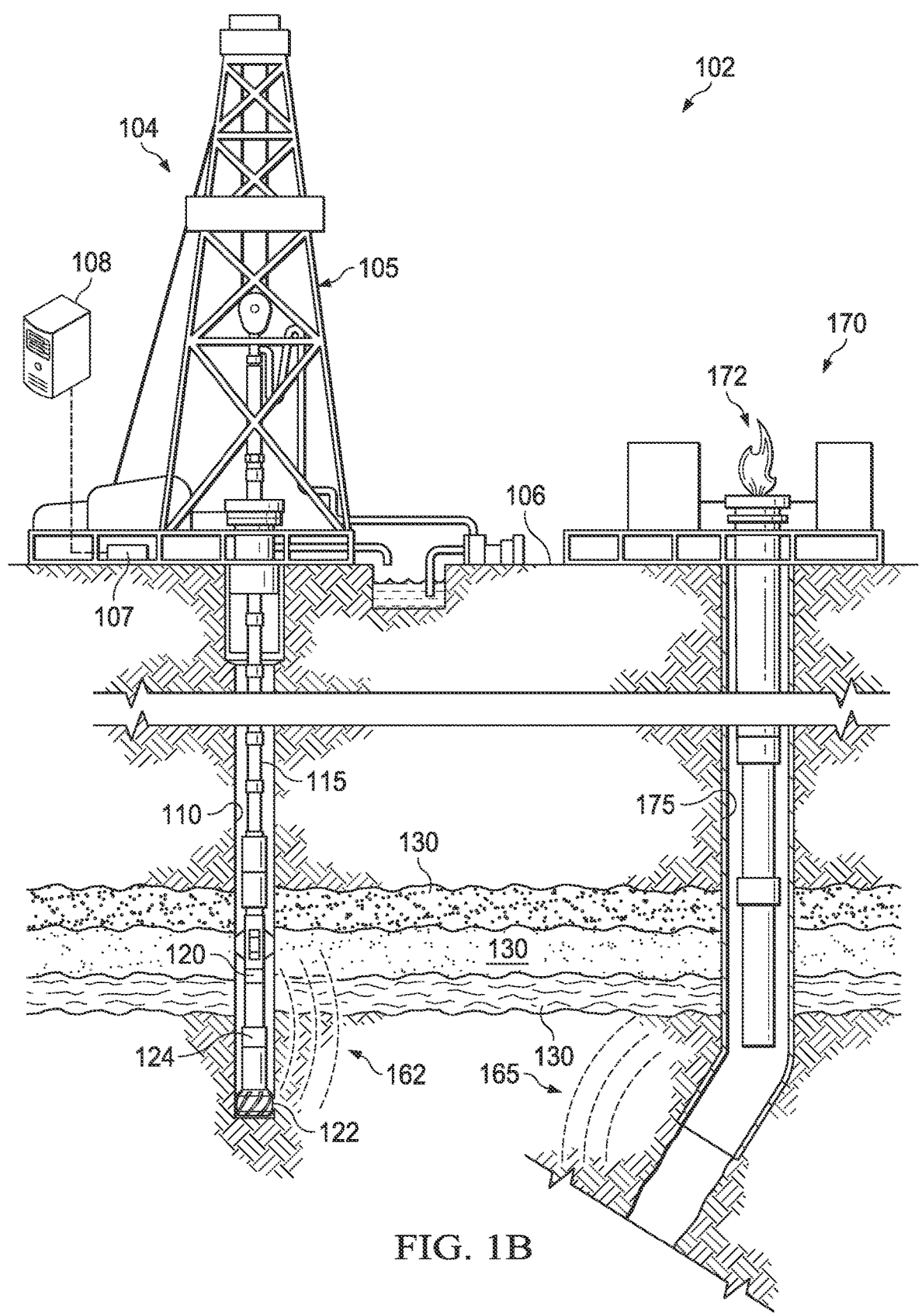
FIG. 1B is an illustration of a diagram of an example active well system using an intercept goal.

FIG. 1B is an illustration of a diagram of an example active well system 102 using an intercept goal. Active well system 102 is similar to FIG. 1A. In FIG. 1B, borehole system 140 has been replaced by a borehole system 170. Borehole system 170 includes borehole 175 and is in a blowout scenario as indicated by blowout 172.

Resistivity tool 124 can generate an electromagnetic signal 162 within subterranean formation 130. Electromagnetic signal 162 can be reflected by borehole 175 creating a magnetic field 165. Magnetic field 165 can be detected by resistivity tool 124 or another sensor with downhole tools 120. Output parameters, such as relative positioning, orientation, dip, and metal pipe diameter parameters, can be estimated or determined from detected magnetic field 165 after reconstructing the resistivity data and extracting the low resistivity data, e.g., information on part of the borehole can be determined. The information can be used to improve the accuracy of the well intercept plan to more efficiently execute the intercept operation. Since borehole system 170 is in a blowout state, access to borehole 175 is not possible so the interception goal has increased importance. A borehole interception should be completed quickly to minimize danger, minimize the loss of production or material, and minimize the well system cost.

FIGS. 1A and 1B depict onshore operations. Those skilled in the art will understand that the disclosure is equally well suited for use in offshore operations. FIGS. 1A and 1B depict specific borehole configurations, those skilled in the art will understand that the disclosure is equally well suited for use in boreholes having other orientations including vertical boreholes, horizontal boreholes, slanted boreholes, multilateral boreholes, and other borehole types.

Figure 2A:
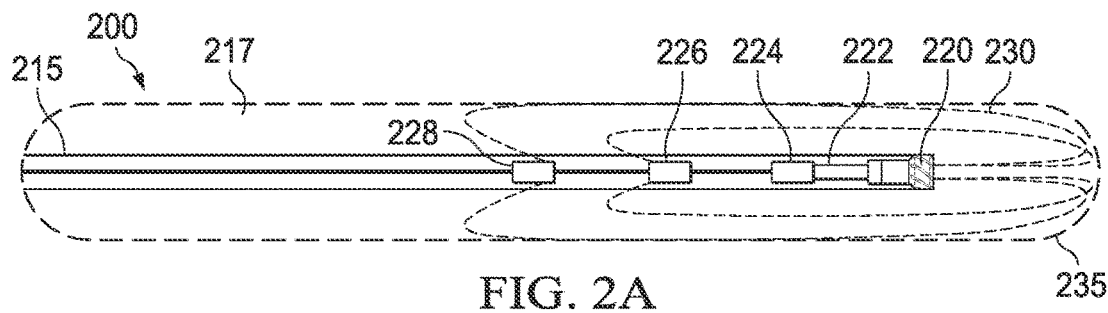
FIG. 2A is an illustration of a diagram of example look ahead model with a transmitter behind a receiver.

FIG. 2A is an illustration of a diagram of example look ahead models 200 with a transmitter behind a receiver. Look ahead model 200 demonstrates a configuration of the resistivity tool and various objects that can be localized ahead of the drilling bit. Look ahead model 200 demonstrates a borehole 215 with a drill string inserted within borehole 215. Borehole 215 has an area 217 showing a volume of the subterranean formation that can be effectively measured using the resistivity tool. Attached at the end of the drill string is a drill bit 220. Attached along the drill string is a rotary steerable tool 222 and resistivity tool components, for example, a resistivity transmitter 224, a first resistivity receiver 226, and a second resistivity receiver 228. In some aspects, there can be fewer resistivity receivers. In some aspects there can be additional resistivity receivers. In some aspects, there can be additional resistivity transmitters.

Resistivity transmitter 224 should be located close enough to drill bit 220 to allow some look ahead capability, for example, depending on the capability of conventional resistivity tools, within 50.0 feet of drill bit 220. The spacing between first resistivity receiver 226 and second resistivity receiver 228 from resistivity transmitter 224 can vary depending on the conditions experienced downhole, subterranean formation characteristics, and how deep into the subterranean formation, e.g., how large the diameter of the surrounding area of area 217, is desired versus improving the accuracy of the detected data. For example, first resistivity receiver 226 can be placed 50.0 feet from resistivity transmitter 224, and second resistivity receiver 228 can be placed 100.0 feet from resistivity transmitter 224. Resistivity lines 230 are shown to demonstrate the approximate volume of information that can be collected by first resistivity receiver 226 and second resistivity receiver 228.

Looking ahead of drill bit 220, beyond the end of borehole 215, is an area of low resistivity 235. Area of low resistivity 235 can be various features or objects, for example, an oil-water barrier, a change in mineralogy or geological composition, an uncased borehole, a casing of a borehole, a metal pipe, or other types of objects or subterranean formation characteristics.

Figure 2B:
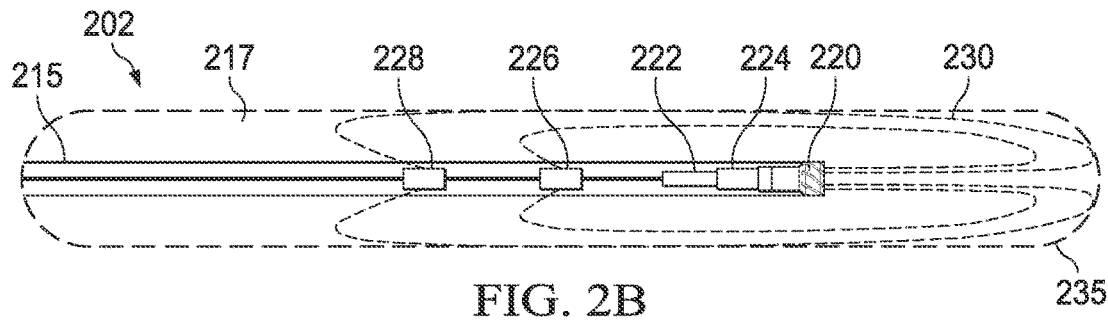
FIG. 2B is an illustration of a diagram of an example look ahead model with a transmitter in front of a receiver.

FIG. 2B is an illustration of a diagram of an example look ahead model 202 with a transmitter in front of a receiver. Look ahead model 202 is similar to look ahead model 200 where it is detecting area of low resistivity 235. Look ahead model 202 is demonstrating that resistivity transmitter 224 can be located closer to drill bit 220 than rotary steerable tool 222. This configuration can extend the look ahead distance as resistivity transmitter 224 is closer to the end of borehole 215. Depending on the subterranean formation characteristics, the energy level transmitted, and the frequencies utilized, resistivity lines 230 can extend various distances beyond drill bit 220, for example, approximately 30.0 to 50.0 feet ahead of drill bit 220. Look ahead model 202 can provide 30.0 to 40.0 feet of notice to rotary steerable tool 222, other geo-steering tools, operators, or well site controllers, compared to look ahead model 200 where the notice can be reduced to 10.0 to 20.0 feet. In some aspects, the look ahead distance can be extended to over 200.0 feet such as with providing additional power to resistivity transmitter 224. These distances are for comparison only as the distances can vary depending on the type of drill bits, drilling units, drill strings, and other equipment in use within borehole 215, as well as the subterranean formation characteristics.

Figure 2C:
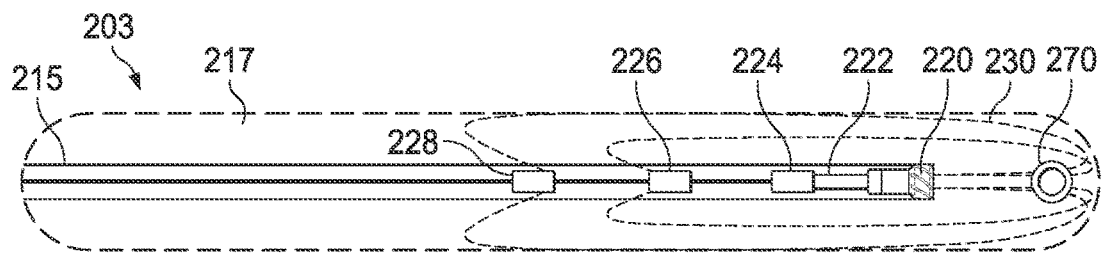
FIG. 2C is an illustration of a diagram of an example look ahead model with a metal pipe ahead of a drill bit assembly.

FIG. 2C is an illustration of a diagram of an example look ahead model 203 with a metal pipe ahead of a drill bit assembly. Look ahead model 203 is similar to the configuration of look ahead model 200. Look ahead model 203 is demonstrating a detection of a metal pipe 270 ahead of drill bit 220.

Figure 2D:
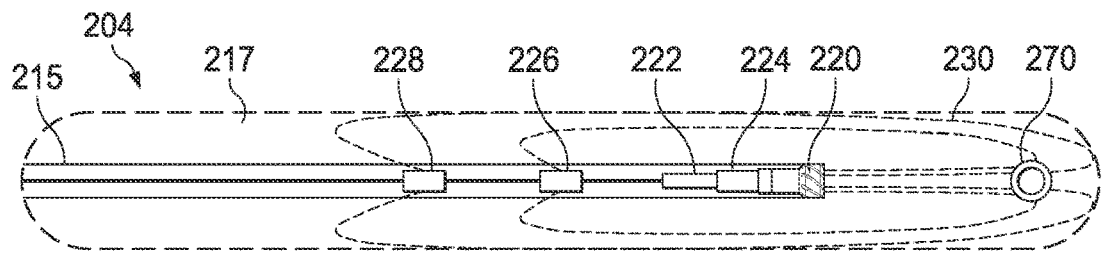
FIG. 2D is an illustration of a diagram of an example look ahead model with a more distant look ahead.

FIG. 2D is an illustration of a diagram of an example look ahead model 204 with a more distant look ahead. Look ahead model 204 is similar to the configuration of look ahead model 202. Look ahead model 204 is demonstrating a detection of metal pipe 270 with more notice, e.g., a larger look ahead distance due to the configuration.

Figure 2E:
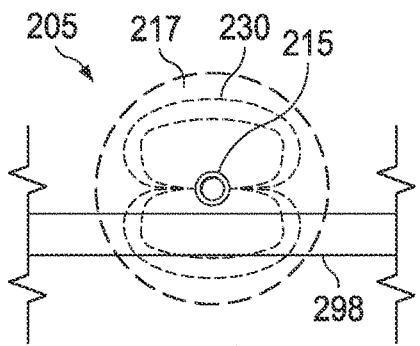
FIG. 2E is an illustration of a diagram of an example cross sectional view of a look ahead model.

FIG. 2E is an illustration of a diagram of an example cross sectional view 205 of a look ahead model. Cross sectional view 205 is a view along borehole 215 further showing the 3D resistivity volume of area 217. Cross sectional view 205 is demonstrating a detection of an adjacent borehole 298 located below borehole 215. Adjacent borehole 298 can be located ahead of or adjacent to borehole 215 since the distance parameter cannot be determined using this perspective.

Figure 3:
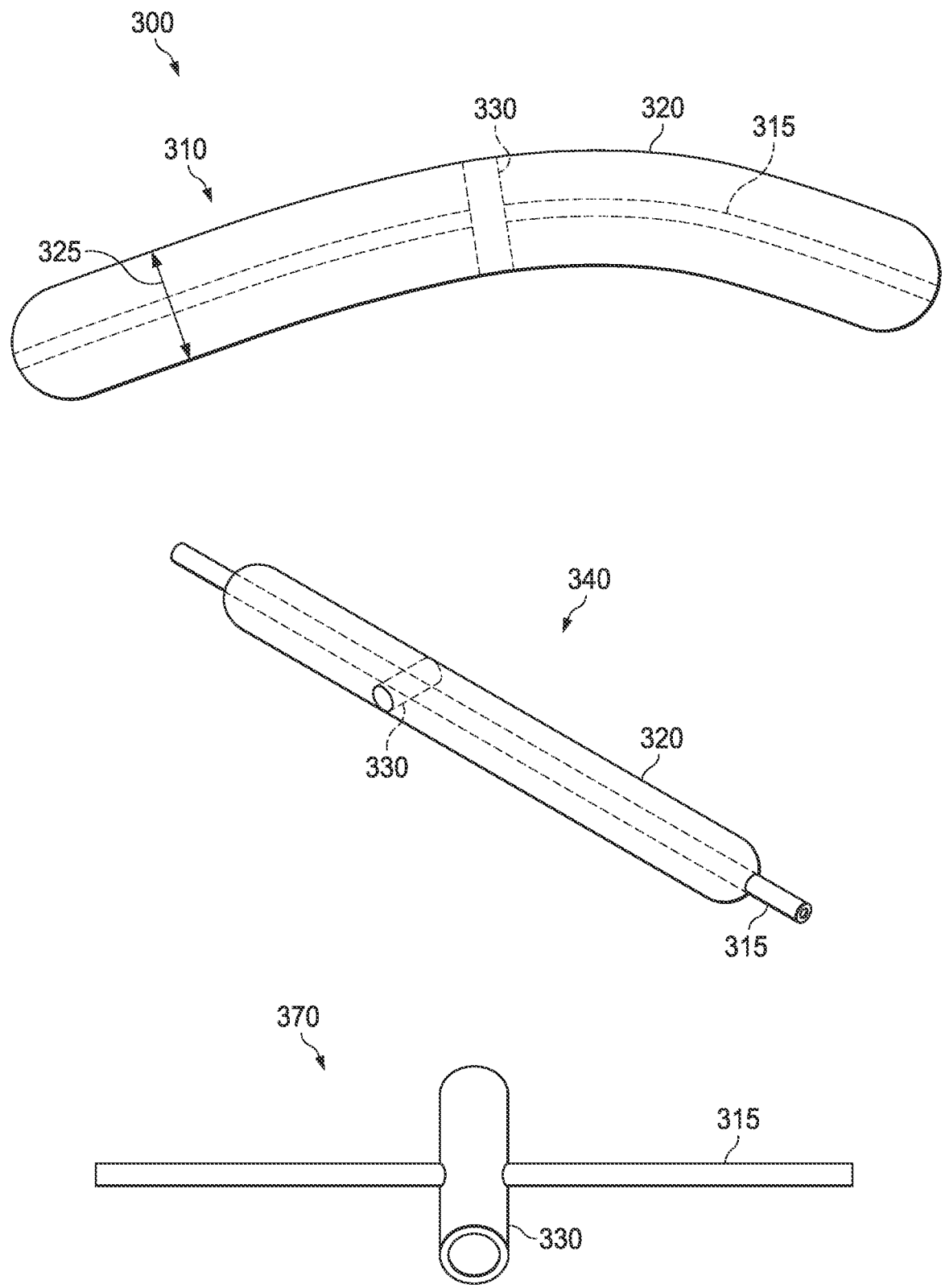
FIG. 3 is an illustration of a diagram of example representations of an area proximate a borehole.

FIG. 3 is an illustration of a diagram of example representations 300 of an area proximate a borehole. Representations 300 were generated using collected resistivity data where a 3D inversion algorithm has been applied to reconstruct the resistivity data. Representations 300 include a horizontal borehole representation 310, an oblique representation 340, and a low resistivity representation 370.

Horizontal borehole representation 310 includes a portion of a borehole 315, a volume 320 of the subterranean formation that has been measured by the resistivity tool, and a size indicator 325. Volume 320 is the collected resistivity data that has been reconstructed by a 3D inversion algorithm. The reconstructed data can be a 3D map of resistivity contrasts. Size indicator 325 indicates the volume diameter, centered on borehole 315. An adjacent borehole 330 is shown as a dark area within volume 320.

Oblique representation 340 shows the same volume 320, as is shown in horizontal borehole representation 310, using an oblique viewing angle. Low resistivity representation 370 shows the same portion of borehole 315 after the low resistivity data has been extracted from the reconstructed resistivity data. Resistivity data above 0.5 ohms has been removed from the representation utilizing a resistivity level of 0.5 ohms. Other resistivity levels can be utilized as well, for example, a resistivity level can be in a range of 0.1 ohms to 1.0 ohms, such as 0.5 ohms or 0.7 ohms, or, higher or lower resistivity levels can be specified. Low resistivity representation 370 highlights adjacent borehole 330 and the output parameters, such as an orientation parameter, a position parameter, a dip parameter, and a diameter parameter of the metal pipe within the adjacent borehole, can be more easily estimated or determined, as compared to horizontal borehole representation 310.

Horizontal borehole representation 310, oblique representation 340, and low resistivity representation 370 are shown using a visual representation. In some aspects, these representations do not need to be generated and the reconstructed resistivity data and the low resistivity data can be utilized by a system for further processing, such as being used by a machine learning algorithm, deep learning neural network, well site controller, geo-steering system, or other well operation systems.

Figure 4:
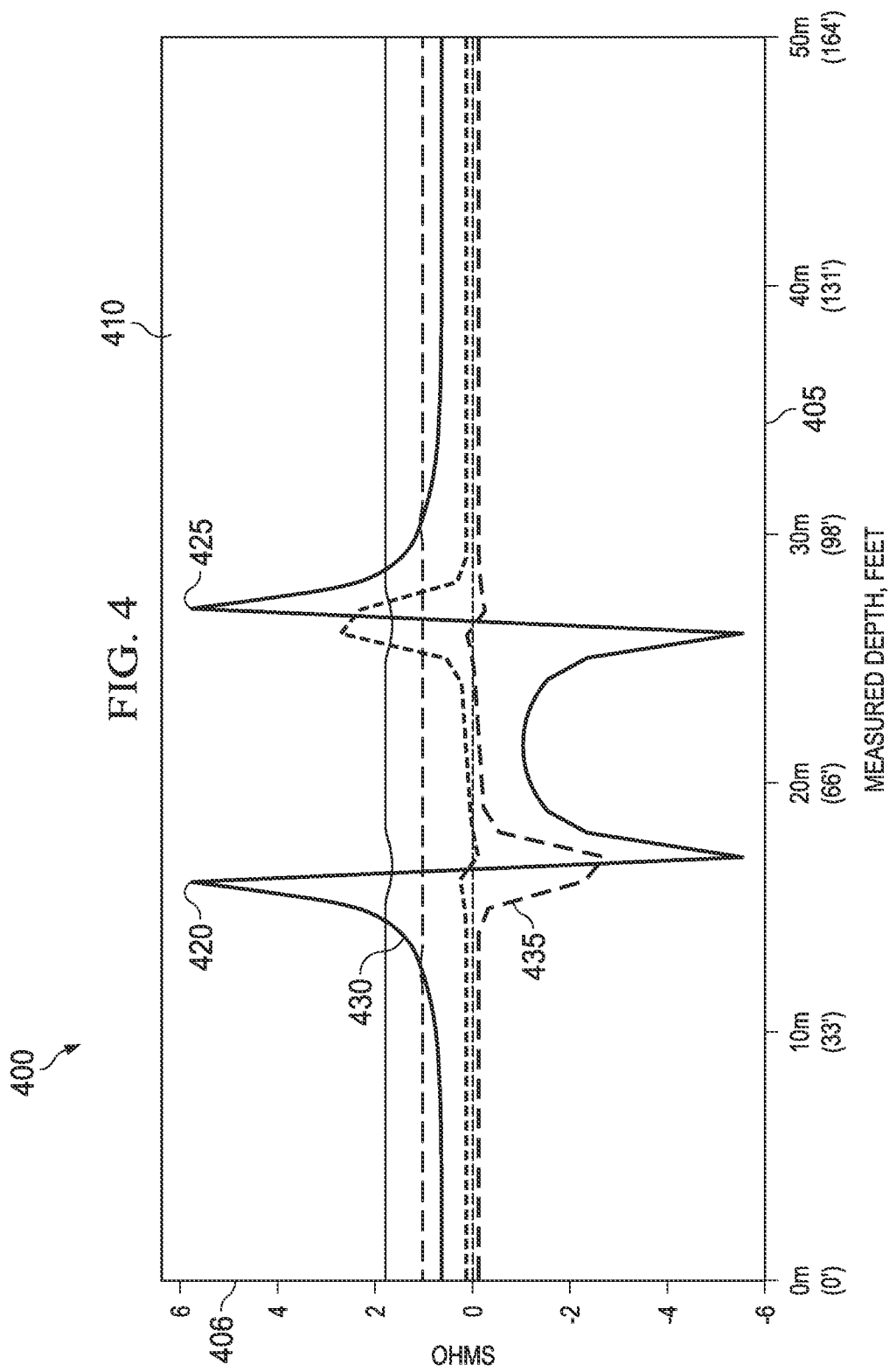
FIG. 4 is an illustration of a diagram of an example graph of raw resistivity measurements.

FIG. 4 is an illustration of a diagram of an example graph 400 of raw resistivity measurements. The resistivity data shown can be used in further analysis, such as identifying look ahead objects or look ahead changes in the subterranean formation. Graph 400 has an x-axis 405 showing the measured depth in feet of the collected component resistivity data. A y-axis 406 shows the relative ohms measured for the collected component resistivity data as received by the resistivity receivers. Plot area 410 shows the 9 plotted components of the resistivity data, such as shown in Matrix 1.

Portion 420 of plot area 410 indicates a portion of the resistivity data as the resistivity transmitter passes the detected object or subterranean formation change. Portion 425 of plot area 410 indicates a portion of the resistivity data as the first resistivity receiver passes the detected object or subterranean formation change. Portion 430 of plot area 410 and portion 435 of plot area 410 indicate the look ahead portion of the collected component resistivity data.

Raw resistivity measurements can be used to detect the approach of changes in resistivity due to wells, subterranean formations or fluids ahead of the resistivity transmitter. Utilizing the 3D inversion capability, this approach can go beyond an indication and can be utilized to quantify the position parameter, the orientation parameter, and the dip parameter of the object or subterranean formation change. By comparing portion 430 and portion 435, it can be seen that seven of the nine components of resistivity deflect a small amount (as demonstrated by portion 430), and two components deflect more significantly (as demonstrated by portion 435). Through knowing which of the resistivity components deflect to a greater degree, a direction to the object or subterranean formation relative to the resistivity sensors can be determined, thereby allowing the generation of a 3D model of the subterranean formation. As the drill bit moves forward, the deflection of each resistivity component changes and that change can be reflected to increase the accuracy of the look ahead 3D model.

Figure 5:
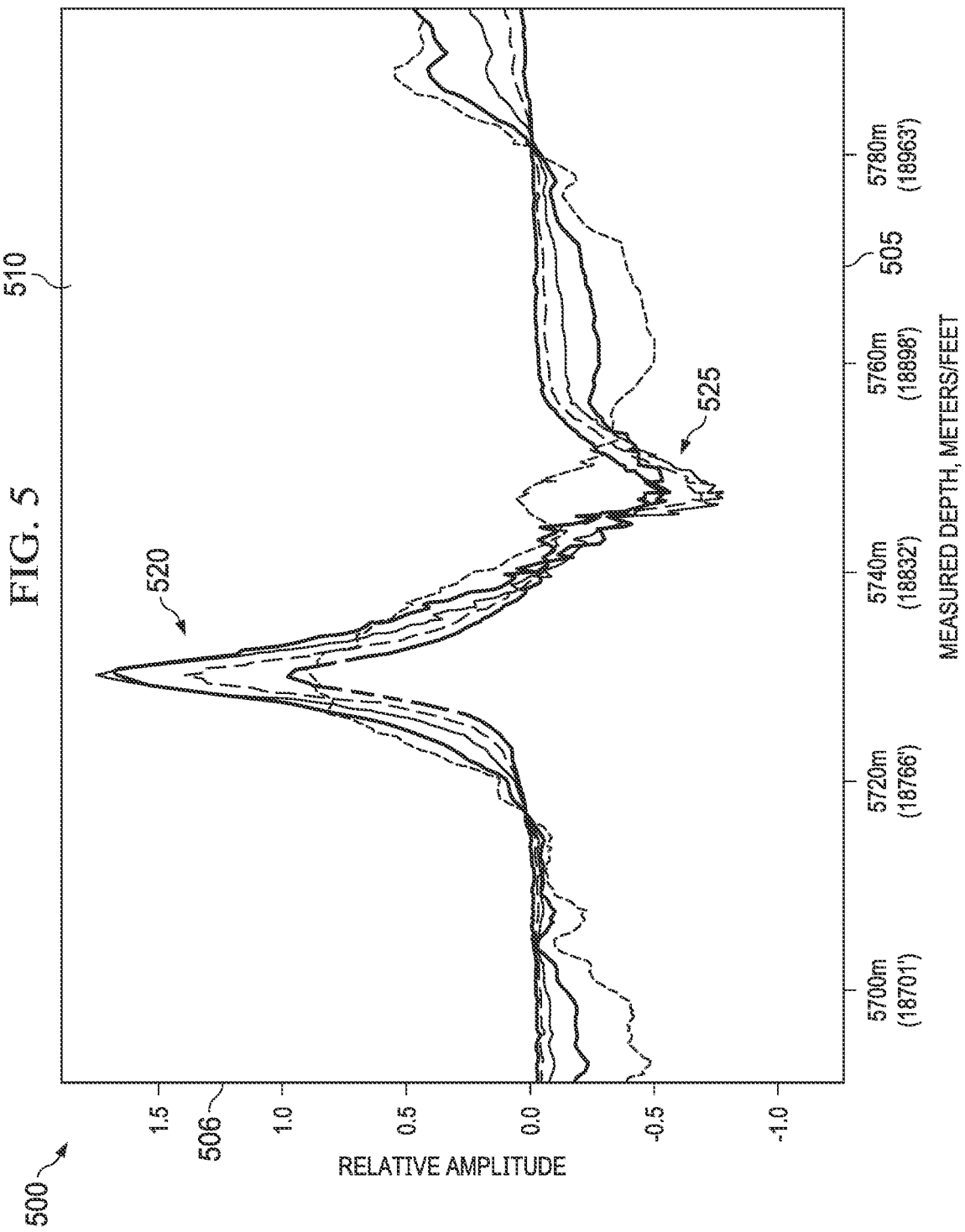
FIG. 5 is an illustration of a diagram of an example graph of a component of resistivity across multiple frequencies.

FIG. 5 is an illustration of a diagram of an example graph 500 of a component of resistivity across multiple frequencies. Graph 500 demonstrates that varying the transmission frequency by the resistivity transmitter and comparing the result for one or more components of the resistivity tensor can assist in indicating objects or subterranean formation changes ahead of or at a radial position relative to the drill bit and borehole. Graph 500 has an x-axis 505 showing the measured depth in meters and feet of the collected component resistivity data. A y-axis 506 shows the relative amplitude for the collected component resistivity data as received by the resistivity receivers. Plot area 510 shows the plotted data for one component of resistivity as generated using five different frequencies, for example, a frequency of 2000 Hz, 4000 Hz, 8000 Hz, 16000 Hz, and 32000 Hz.

Data portion 520 and data portion 525 show areas where the resistivity component deflected from the relative 0.0 amplitude position. The varying amplitude deflections at the differing frequencies for data portion 520 and the varying amplitude deflections at the differing frequencies for data portion 525 can be utilized as inputs to an algorithm, such as a 3D inversion algorithm to be part of the information used to generate a 3D model of the subterranean formation and potential objects around, e.g., along a radial line, or ahead of the borehole. For example, graph 500 can be used to identify whether an offset well is above or below the borehole being drilled.

Figure 6:
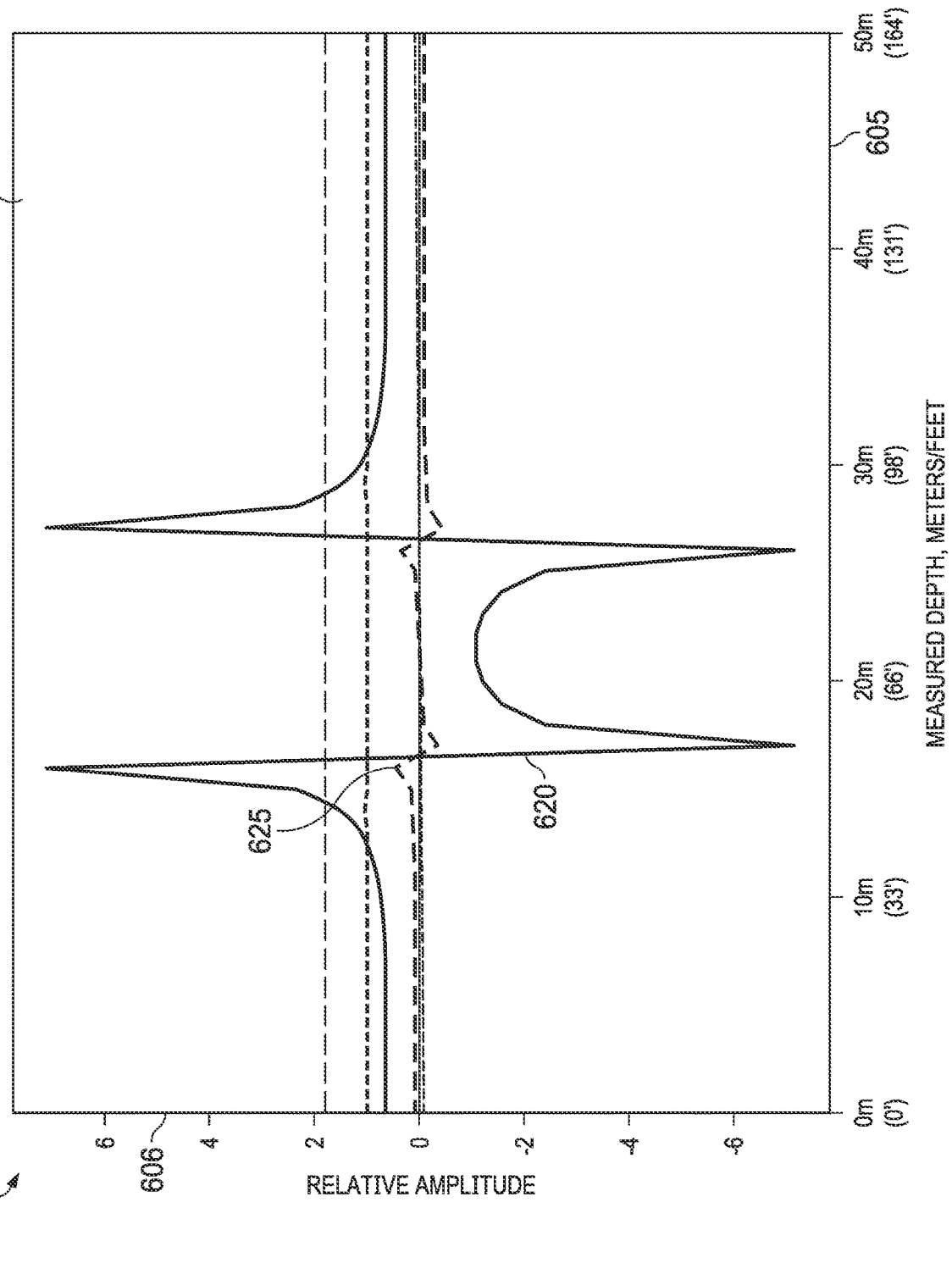
FIG. 6 is an illustration of a diagram of an example graph showing deflection of one component of resistivity.

FIG. 6 is an illustration of a diagram of an example graph 600 showing deflection of one component of resistivity using a simulated set of inputs. Graph 600 can be used, for example, to identify whether an object or subterranean formation change is approximately at the same level as the drilling borehole, e.g., a potential collision scenario. Graph 600 has an x-axis 605 showing the simulated measured depth in meters and feet of the collected component resistivity data. A y-axis 606 shows the relative amplitude for the collected component resistivity data as received by the resistivity receivers. Plot area 610 shows the plotted data for seven components of resistivity.

Line 620 represents the $\rho_{xx}$ resistivity component and line 625 represents the $\rho_{zx}$ resistivity component. In this demonstration, line 620 shows significant deflection in amplitude. Line 625 shows comparatively little reaction or deflection in amplitude. This can be an indication that the look ahead object or subterranean formation change is at the same level as the drilling borehole and therefore a potential collision may take place. This information can be provided to systems or users to adjust the geo-steering of the drill bit to avoid (or to target) the look ahead object or subterranean formation change.

FIG. 7 is an illustration of a diagram of an example graph 700 showing deflection of two components of resistivity using a simulated set of inputs. Graph 700 can be used, for example, to identify whether an object or subterranean formation change is approximately at the same level, slightly above, or slightly below the drilling borehole. Graph 700 has an x-axis 705 showing the simulated measured depth in meters and feet of the collected component resistivity data. A y-axis 706 shows the relative amplitude for the collected component resistivity data as received by the resistivity receivers. Plot area 710 shows the plotted data for seven components of resistivity.

Line 720 represents the $\rho_{xx}$ resistivity component, line 725 represents the $\rho_{zx}$ resistivity component, and line 727 represents the $\rho_{xz}$ resistivity component. In this demonstration, line 720 shows significant deflection in amplitude, similar to graph 600. Line 725 and line 727 show comparatively moderate reaction or deflection in amplitude. In this simulation, an object was placed 12.5 centimeters above the borehole being drilled. The deflection of line 725 and line 727 demonstrate that the processes described herein can be utilized to detect a look ahead object or subterranean formation change that is slightly above or below the borehole being drilled. Further analysis of the other resistivity components can be utilized to confirm whether the object or subterranean formation change is above or below. This information can be provided to other systems or users such as to adjust the geo-steering of the drill bit to avoid (or to target) the look ahead object or subterranean formation change.

Figure 8A:
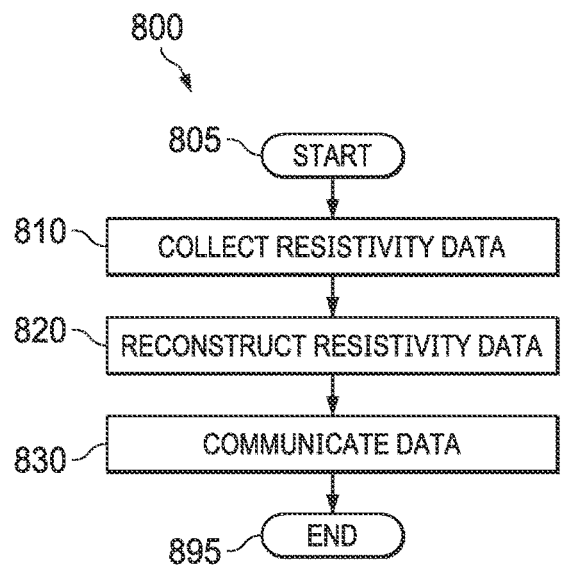
FIG. 8A is an illustration of a flow diagram of an example method to localize an adjacent object or subterranean formation change.

FIG. 8A is an illustration of a flow diagram of an example method 800 to localize an object or subterranean formation change relative to an active borehole. Method 800 can be performed on a computing system, such as a well site controller, a geo-steering system, a BHA, a borehole localization controller, or other computing system capable of receiving the collected component resistivity data, and capable of communicating with equipment or a user at a well site, for example, borehole localization system 900 of FIG. 9. Other computing systems can be a smartphone, PDA, laptop computer, desktop computer, server, data center, cloud environment, or other computing system. Method 800 can be encapsulated in software code or in hardware, for example, an application, code library, dynamic link library, module, function, RAM, ROM, and other software and hardware implementations. The software can be stored in a file, database, or other computing system storage mechanism. Method 800 can be partially implemented in software and partially in hardware. For example, one or more of the steps of method 800 can be performed on data localizer 920 of FIG. 9 or processor 1030 of FIG. 10.

Method 800 starts at a step 805 and proceeds to a step 810. In step 810 the process can collect resistivity data using a resistivity tool located downhole in an active borehole. The resistivity tool can be various sensors capable of collecting the data, such as an ultra-deep resistivity tool. The resistivity tool can comprise at least one transmitter and at least one receiver. The resistivity tool can also receive input parameters, such as a time when to perform actions. In some aspects, the resistivity tool can orient the collected component resistivity data to a known coordinate system, for example using an azimuthal resistivity tool. This can increase the accuracy of the parameters derived for the object or subterranean formation change.

In a step 820, the collected component resistivity data can be reconstructed using a 3D inversion algorithm. The algorithm can utilize one or more inversion algorithms. In some aspects, an input parameter can be used to specify the type of inversion algorithm to utilize. In some aspects, a machine learning or deep learning neural network system can be utilized to preprocess the resistivity data prior to the 3D inversion algorithm being applied. For example, a machine learning algorithm can be used to enhance the resistivity data, enhance contrasts of the resistivity data, remove noise from the resistivity data, and other pre-processing can be applied.

Proceeding to a step 830, the reconstructed resistivity data, e.g., a 3D map of resistivity (computed generated results), can be communicated to one or more systems, processes, computing systems, or users. The data can be utilized to update a well site job plan to direct the path of the developing active borehole, for example, the data can include information on part of an object or subterranean formation change. The accuracy of the location of the path, relative to other objects or subterranean formation changes in the field, can be improved over placement techniques that dot not utilize this method. Method 800 ends at a step 895.

Figure 8B:
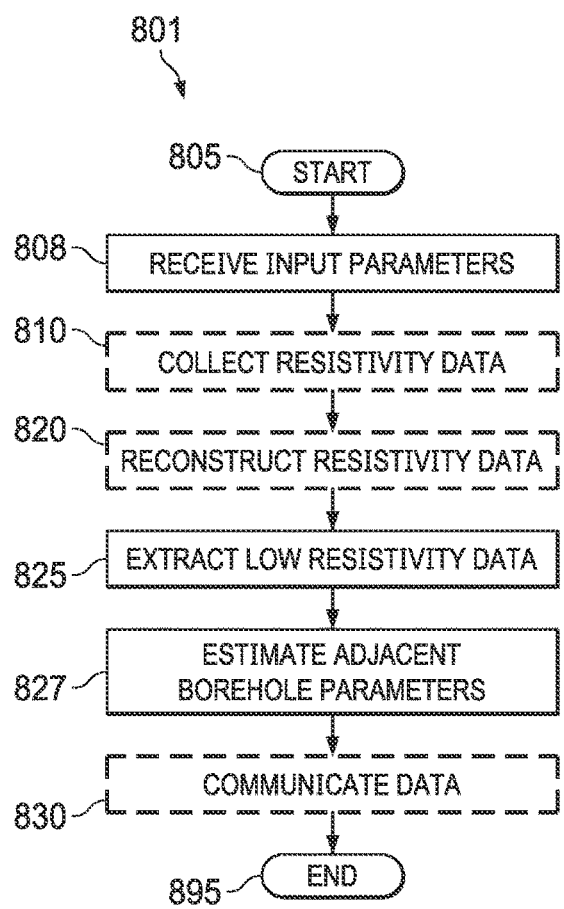
FIG. 8B is an illustration of a flow diagram of an example method, building on FIG. 8A, to estimate adjacent object or subterranean formation change parameters.

FIG. 8B is an illustration of a flow diagram of an example method 801 to estimate adjacent or look ahead borehole parameters. Method 801 builds on method 800 where method 800 steps are shown using a dotted rectangle. Method 801 starts at step 805 and proceeds to a step 808. In step 808, input parameters can be received. The input parameters can be parameters, instructions, directions, data, energy levels, frequencies, and other information to enable or direct the remaining processing of method 801. For example, the input parameters can include one or more of a time to perform method 801, an 3D inversion algorithm to utilize, a resistivity level, an energy level for the resistivity transmitter to utilize, a frequency parameter for the transmitter to utilize, an output system to receive the various data elements (such as the collected component resistivity data, the reconstructed resistivity data, the low resistivity data), and other input parameters. In some aspects, the input parameters can be the output from a machine learning or deep learning system. For example, one or more of the steps of method 801 can be performed on data localizer 920 of FIG. 9 or processor 1030 of FIG. 10.

Method 801 proceeds to step 810 and step 820. Proceeding to a step 825, low resistivity data can be extracted from the reconstructed resistivity data. A resistivity level parameter can be utilized to determine a cutoff point for the extraction process, for example, removing data over a specified ohms value. The low resistivity data can be used to determine other parameters. Proceeding to a step 827, the low resistivity data can be utilized to estimate or determine parameters of one or more objects or subterranean formation changes, e.g., information on part of the object or subterranean formation change. Output parameters, such as a position parameter, an orientation parameter, a dip parameter, or a diameter parameter of an object (such as a metal pipe) or subterranean formation change (such as an oil-water barrier) can be estimated or determined. These parameters can be used by other systems to improve the path positioning of an active borehole relative to existing objects or subterranean formation changes.

Method 801 proceeds to step 830 where the generated results can be communicated to other systems or processes. For example, the computed generated results can include one or more of the output parameters, such as the position parameter, the orientation parameter, the dip parameter, the diameter parameter, as well as the collected component resistivity data, the reconstructed resistivity data, or the low resistivity data. Method 801 ends at the step 895.

Figure 9:
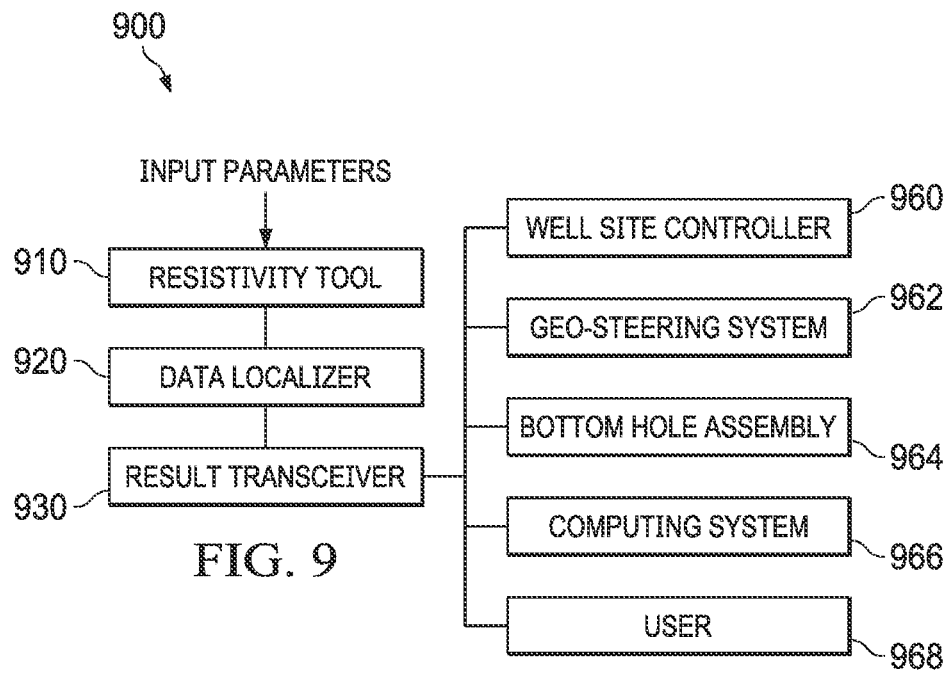
FIG. 9 is an illustration of a block diagram of an example borehole localization system.

FIG. 9 is an illustration of a block diagram of an example borehole localization system 900, which can be implemented using a resistivity tool and in one or more computing systems, for example, a well site controller, a reservoir controller, a borehole localization controller, a data center, cloud environment, server, laptop, smartphone, tablet, and other computing systems. The computing system can be located proximate the well site, or a distance from the well site, such as in a data center, cloud environment, or corporate location. The computing system can be a distributed system having a portion located proximate the well site and a portion located remotely from the well site. In some aspects, borehole localization system 900 can be implemented using a borehole localization controller such as borehole localization controller 1000 of FIG. 10.

Borehole localization system 900, or a portion thereof, can be implemented as an application, a code library, dynamic link library, function, module, other software implementation, or combinations thereof. In some aspects, borehole localization system 900 can be implemented in hardware, such as a ROM, a graphics processing unit, or other hardware implementation. In some aspects, borehole localization system 900 can be implemented partially as a software application and partially as a hardware implementation. Borehole localization system 900 is a functional view of the disclosed processes and an implementation can combine or separate the described functions in one or more software or hardware systems.

Borehole localization system 900 includes a resistivity tool 910, a data localizer 920, and a result transceiver 930. The borehole localization parameters from data localizer 920 can be communicated to a data receiver, such as one or more of a well site controller 960, a geo-steering system 962, a BHA 964, a computing system 966, or a user 968. The borehole localization data can be used to ensure the borehole is being drilled per the well site operation plan or is otherwise proceeding along the intended drilling path.

Resistivity tool 910 can receive input parameters to direct its operations. The input parameters can be parameters, energy levels, frequencies, instructions, directions, data, and other information to enable or direct the remaining processing of borehole localization system 900. For example, the input parameters can include a time at which to perform the method and processes, an algorithm to utilize, a resistivity level, an energy level to utilize by the transmitter, one or more frequencies to output, an output system to receive the collected component resistivity data, the reconstructed resistivity data, a 3D map of resistivity contrasts, and the low resistivity data, output from a machine learning system, and other input parameters.

Resistivity tool 910 can collect measurements from a portion of the surrounding subterranean formation around a borehole or a portion of the look ahead area, where the portion is proximate the location of the resistivity tool. The collected data, e.g., measurements, can be reconstructed into reconstructed resistivity data by data localizer 920, or another computing system. In some aspects, data localizer 920 can be part of resistivity tool 910, well site controller 960, geo-steering system 962, BHA 964, or computing system 966. In some aspects, data localizer 920 can be configured to extract low resistivity data utilizing a resistivity level parameter. In some aspects, data localizer 920 can be configured utilize the reconstructed resistivity data and the low resistivity data to generate a visual representation of the respective data.

Result transceiver 930 can communicate one or more generated results, collected component resistivity data, reconstructed resistivity data, and low resistivity data, to one or more data receivers, such as geo-steering system 962, a geo-steering controller, well site controller 960, computing system 966, BHA 964, a drilling system, user 968, or other well related systems. For example, result transceiver 930 can communicate the various parameters and data to geo-steering system 962 or well site controller 960, where the drilling operation of the active borehole is then altered, utilizing the various parameters as inputs, to follow a new drilling path. Resistivity tool 910, data localizer 920, and result transceiver 930 can be, or can include, conventional interfaces configured for transmitting and receiving data.

Data localizer 920 can be configured implement the analysis and algorithms as described herein utilizing the collected component resistivity data and the input parameters. Data localizer 920 can be configured to use one or more algorithms, such as machine learning, decision tree, random forest, logistic regression, linear, and other algorithms to determine the borehole localization data.

A memory or data storage of data localizer 920 can be configured to store the processes and algorithms for directing the operation of data localizer 920. Data localizer 920 can also include a processor that is configured to operate according to the analysis operations and algorithms disclosed herein, and an interface to communicate (transmit and receive) data.

Figure 10:
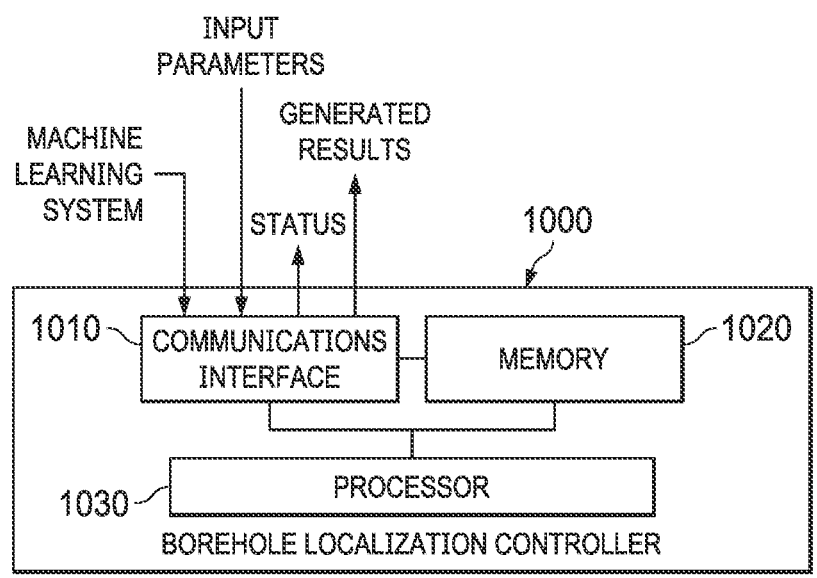
FIG. 10 is an illustration of a block diagram of an example of a borehole localization controller according to the principles of the disclosure.

FIG. 10 is an illustration of a block diagram of an example of borehole localization controller 1000 according to the principles of the disclosure. Borehole localization controller 1000 can be stored on a single computer or on multiple computers. The various components of borehole localization controller 1000 can communicate via wireless or wired conventional connections. A portion or a whole of borehole localization controller 1000 can be located downhole at one or more locations and other portions of borehole localization controller 1000 can be located on a computing device or devices located at the surface or a distant location from the borehole. In some aspects, borehole localization controller 1000 can be wholly located at a surface or distant location. In some aspects, borehole localization controller 1000 is part of a geo-steering system, and can be integrated in a single device.

Borehole localization controller 1000 can be configured to perform the various functions disclosed herein including receiving input parameters and generating results from an execution of the methods and processes described herein. Borehole localization controller 1000 includes a communications interface 1010, a memory 1020, and a processor 1030.

Communications interface 1010 is configured to transmit and receive data. For example, communications interface 1010 can receive the input parameters. Communications interface 1010 can transmit the various resistivity data, and other generated results, such as one or more of the output parameters, for example, the position parameter, the orientation parameter, the dip parameter, the diameter parameter of metal pipe, as well as the collected resistivity data, the reconstructed resistivity data, and the low resistivity data. In some aspects, communications interface 1010 can transmit a status, such as a success or failure indicator of borehole localization controller 1000 regarding receiving the input parameters, transmitting the generated results, or producing the generated results, including the reconstructed resistivity data and the various parameters. In some aspects, communications interface 1010 can receive input parameters from a machine learning system, such as when the resistivity data is analyzed by a machine learning algorithm prior to being utilized as an input into the described processes and methods. Communications interface 1010 can communicate via communication systems used in the industry. For example, wireless or wired protocols can be used. Communication interface 1010 is capable of performing the operations as described for data localizer 920 and result transceiver 930.

Memory 1020 can be configured to store a series of operating instructions that direct the operation of processor 1030 when initiated, including the code representing the algorithms for determining the alignment parameters. Memory 1020 is a non-transitory computer readable medium. Multiple types of memory can be used for data storage and memory 1020 can be distributed.

Processor 1030 can be configured to produce the generated results, including the reconstructed resistivity data, one or more of the parameters, and statuses utilizing the received input parameters, and, if provided, the machine learning system inputs. For example, processor 1030 can perform an analysis of the resistivity data to determine one or more output parameters, such as a position parameter, an orientation parameter, a dip parameter, or a diameter parameter of metal pipe. Processor 1030 can be configured to direct the operation of the borehole localization controller 1000. Processor 1030 includes the logic to communicate with communications interface 1010 and memory 1020, and perform the functions described herein to determine the alignment parameters and statuses. For example, processor 1030 can perform the operations as described by method 800 of FIG. 8A and method 801 of FIG. 8B. Processor 1030 is capable of performing or directing the operations as described by data localizer 920.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Configured means, for example, designed, constructed, or programmed, with the necessary logic and/or features for performing a task or tasks. A configured device, therefore, is capable of performing the task or tasks. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, because the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects as described in the SUMMARY section can have one or more of the following additional elements in combination. Element 1: wherein the object or the subterranean formation change is located at one or more of a radial position or a look ahead area respective to the active borehole. Element 2: further including communicating the generated results to one or more of a user, a well site controller, or a geo-steering system. Element 3: further including receiving input parameters. Element 4: wherein the input parameters are utilized by the collecting and reconstructing. Element 5: the input parameters are one or more of a time to perform the method, an output system to receive the component resistivity data or the reconstructed resistivity data, a 3D inversion algorithm to utilize, a resistivity level, an energy level for a resistivity transmitter, or a frequency parameter for the resistivity transmitter. Element 6: further including extracting low resistivity data from the reconstructed resistivity data utilizing the resistivity level. Element 7: wherein the resistivity level is in a range of 0.1 ohms to 1.0 ohms. Element 8: further including generating a visual representation of the low resistivity data. Element 9: further including estimating at least one output parameter of the object or the subterranean formation change. Element 10: wherein the at least one output parameter is one or more of a position parameter, an orientation parameter, a dip parameter, or a diameter parameter, and the generated results utilizes the at least one output parameter. Element 11: wherein the reconstructing is performed using a data localizer. Element 12: wherein the object is a second borehole, a metal pipe, or a borehole casing, or the subterranean formation change is an oil-water barrier. Element 13: wherein the object is one or more objects located in a subterranean formation of the well site, or the subterranean formation change is one or more subterranean formation changes. Element 14: wherein the data localizer is further capable of generating a position parameter, an orientation parameter, a dip parameter, or a diameter parameter of metal pipe. Element 15: further including a result transceiver, capable of communicating generated results. Element 16: wherein the generated results utilizes one or more of the component resistivity data, the reconstructed resistivity data, the low resistivity data, the position parameter, the orientation parameter, the dip parameter, or the diameter parameter of metal pipe. Element 17: further including a data receiver, capable of receiving the generated results. Element 18: wherein the data receiver is one or more of a well site controller, a geo-steering system, a bottom hole assembly (BHA), a borehole localization controller, a computing system, or a user. Element 19: wherein the data receiver is further capable of generating a visual representation of the reconstructed resistivity data or the low resistivity data. Element 20: wherein the data localizer is part of the well site controller, the geo-steering system, the BHA, the borehole localization controller, the computing system, or the resistivity tool. Element 21: wherein the data localizer is further capable of generating a visual representation of the reconstructed resistivity data or the low resistivity data. Element 22: wherein the resistivity tool is an ultra-deep resistivity tool. Element 23: wherein the object is an adjacent borehole, a metal pipe, or a casing, or the subterranean formation change is an oil-water barrier. Element 24: further including receiving input parameters. Element 25: wherein the input parameters are utilized by the resistivity tool, the reconstructing, and the directing. Element 26: wherein the input parameters are one or more of a time to execute the operations, an output system to receive the component resistivity data or the reconstructed resistivity data, a 3D inversion algorithm to utilize, a resistivity level, an energy level for a resistivity transmitter, or a frequency parameter for the resistivity transmitter. Element 27: extracting low resistivity data from the reconstructed resistivity data utilizing the resistivity level. Element 28: further including generating a visual representation of the low resistivity data. Element 29: further including computing output parameters utilizing the reconstructed resistivity data. Element 30: wherein the output parameters are associated with the object or the subterranean formation change and is at least one of a position parameter, an orientation parameter, a dip parameter, or a diameter parameter. Element 31: wherein the generated results utilizes the output parameters. Element 32: wherein the object or the subterranean formation change is located along a radial line from the active borehole. Element 33: wherein the object or subterranean formation change is located in a look ahead area of the active borehole.

What is claimed is:

1. A method, comprising:
   collecting resistivity data utilizing a resistivity tool located downhole an active borehole of a well site, wherein the resistivity data represents part of an adjacent borehole or part of an adjacent object;
   analyzing the deflection of at least one component of the resistivity data to identify a degree of deflection for the at least one component of the resistivity data;
   generating reconstructed resistivity data by reconstructing the collected resistivity data utilizing a three-dimensional (3D) inversion algorithm and the degree of deflection for the at least one component of the resistivity data, wherein the adjacent borehole or the adjacent object is located proximate the active borehole;
   localizing a subterranean position of the adjacent borehole or the adjacent object in relation to the active borehole utilizing the reconstructed resistivity data; and
   adjusting a geo-steering of a drill bit using the reconstructed resistivity data and the subterranean position.

2. The method as recited in claim 1, further comprising:
   communicating the reconstructed resistivity data to one or more of a user, a well site controller, or a geo-steering system proximate the well site.

3. The method as recited in claim 1, further comprising:
   receiving input parameters, wherein the input parameters are utilized by the collecting and by the reconstructing to generate the reconstructed resistivity data.

4. The method as recited in claim 3, wherein the input parameters are one or more of an identification of a time to perform the actions, a system to receive the various data, identifying the 3D inversion algorithm to utilize, or a resistivity level.

5. The method as recited in claim 4, further comprising: extracting low resistivity data from the reconstructed resistivity data utilizing the resistivity level.

6. The method as recited in claim 5, wherein the resistivity level is in the range of 0.1 ohms to 1.0 ohms.

7. The method as recited in claim 5, further comprising: generating a visual representation of the low resistivity data.

8. The method as recited in claim 5, further comprising: estimating at least one generated result and communicating the at least one generated result to a well site system.

9. The method as recited in claim 8, wherein the at least one generated result is one or more of a position parameter, an orientation parameter, a dip parameter, or a diameter parameter of metal pipe of the adjacent borehole.

10. The method as recited in claim 1, when the reconstructing is performed in a system located at the surface.

11. A borehole localization system, comprising:
a resistivity tool, capable of receiving one or more input parameters and collecting resistivity data of part of an adjacent borehole or an adjacent object, wherein the resistivity tool is located within an active borehole of a well system; and
a data localizer, capable of reconstructing resistivity data from the collected resistivity data and extracting low resistivity data from the reconstructed resistivity data, analyzing the deflection of at least one component of the resistivity data to identify a degree of deflection for the at least one component of the resistivity data, localizing a subterranean position of the adjacent borehole or the adjacent object in relation to the active borehole utilizing the reconstructed resistivity data and the degree of deflection for the at least one component of the resistivity data, and adjusting a geo-steering of a drill bit using the reconstructed resistivity data and the subterranean position.

12. The borehole localization system as recited in claim 11, further comprising:
a bottom hole assembly, capable of communicating one or more of the collected resistivity data, the reconstructed resistivity data, or the low resistivity data.

13. The borehole localization system as recited in claim 11, further comprising:
a geo-steering system, capable of receiving one or more of the collected resistivity data, the reconstructed resistivity data, or the low resistivity data.

14. The borehole localization system as recited in claim 11, wherein the data localizer is further capable of generating a visual representation of the reconstructed resistivity data or the low resistivity data.

15. The borehole localization system as recited in claim 11, wherein the data localizer is a component of the resistivity tool.

16. The borehole localization system as recited in claim 11, wherein the resistivity tool orients the resistivity data to a known coordinate system.

17. The borehole localization system as recited in claim 11, wherein the resistivity tool is an ultra-deep resistivity tool.

18. A computer program product having a series of operating instructions stored on a non-transitory computer-readable medium that directs a data processing apparatus when executed thereby to perform operations to determine borehole localization parameters from collected resistivity data, the operations comprising:
directing a collection of resistivity data utilizing a resistivity tool located downhole an active borehole of a well site, wherein the resistivity data represents part of an adjacent borehole or an adjacent object, where the adjacent object is part of a metal pipe or part of a borehole casing;
analyzing the deflection of at least one component of the resistivity data to identify a degree of deflection for he at least one component of the resistivity data;
generating reconstructed resistivity data by reconstructing the collected resistivity data utilizing a three-dimensional (3D) inversion algorithm and the degree of deflection for the at least one component of the resistivity data, wherein the adjacent borehole or the adjacent object is located proximate the active borehole;
localizing a subterranean position of the adjacent borehole or the adjacent object in relation to the active borehole utilizing the reconstructed resistivity data; and
directing an adjustment of a geo-steering of a drill bit using the reconstructed resistivity data and the subterranean position.

19. The computer program product as recited in claim 18, further comprising:
directing a communication of the reconstructed resistivity data to a well site controller.

20. The computer program product as recited in claim 18, further comprising:
receiving input parameters, wherein the input parameters are utilized by the directing and by the reconstructing to generate the reconstructed resistivity data, where one of the input parameters is an indication of the type of 3D inversion algorithm to utilize.

* * * * *

UNITED STATES PATENT AND TRADEMARK OFFICE
CERTIFICATE OF CORRECTION

PATENT NO. : 12,091,964 B2
APPLICATION NO. : 17/212486
DATED : September 17, 2024
INVENTOR(S) : Nigel Mark Clegg et al.

It is certified that error appears in the above-identified patent and that said Letters Patent is hereby corrected as shown below:

On the Title Page

Item (54) and in the Specification, Column 1, Lines 1-3, delete "BOREHOLE LOCALIZATION RELATIVE TO OBJECTS AND SUBTERRANREAN FORMATIONS" and insert --BOREHOLE LOCALIZATION RELATIVE TO OBJECTS AND SUBTERRANEAN FORMATIONS--

Signed and Sealed this
Twenty-ninth Day of October, 2024

Katherine Kelly Vidal
*Director of the United States Patent and Trademark Office*